United States Patent
Bianco et al.

(10) Patent No.: US 10,205,377 B1
(45) Date of Patent: Feb. 12, 2019

(54) ACTIVE CLAMP FLYBACK CONVERTER CONTROL WITH REDUCED CURRENT

(71) Applicant: STMICROELECTRONICS S.R.L., Agrate Brianza (IT)

(72) Inventors: Alberto Bianco, Gressan (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/948,183

(22) Filed: Apr. 9, 2018

(51) Int. Cl.
*H02M 1/08* (2006.01)
*H02M 3/335* (2006.01)
*H02M 1/00* (2006.01)

(52) U.S. Cl.
CPC ....... *H02M 1/083* (2013.01); *H02M 3/33592* (2013.01); *H02M 2001/0009* (2013.01); *H02M 2001/0058* (2013.01)

(58) Field of Classification Search
CPC ............. H02M 3/335; H02M 3/33569; H02M 3/33507; H02M 3/33515; H02M 3/33576; H02M 3/33592; H02M 3/33523; H02M 1/083; H02M 2001/058
USPC ... 363/20, 21.01, 21.12, 21.13, 21.14, 21.15
See application file for complete search history.

(56) References Cited

U.S. PATENT DOCUMENTS

| | | | | |
|---|---|---|---|---|
| 5,245,520 A | * | 9/1993 | Imbertson | H02M 3/337 363/132 |
| 7,760,525 B2 | * | 7/2010 | Sutardja | H02M 3/157 363/21.12 |
| 7,872,879 B2 | * | 1/2011 | Degen | H02M 3/33592 363/21.04 |
| 10,003,267 B1 | * | 6/2018 | Zhao | H02M 3/3376 |

* cited by examiner

*Primary Examiner* — Adolf Berhane
(74) *Attorney, Agent, or Firm* — Seed IP Law Group LLP (57) ABSTRACT

A method and controller for controlling a converter are provided. The converter is operated in a first phase in which controller logic asserts a first gate drive signal to cause a first transistor of the converter to be conductive and deasserts a second gate drive signal to cause a second transistor of the converter to be non-conductive. In a first deadtime phase and a second phase, the controller logic deasserts both the first and second gate drive signals to cause leakage energy from a leakage inductance of a primary winding of the converter to be transferred to a clamp capacitance of the converter. After the leakage energy is transferred, the converter is operated in a third phase in which the logic asserts the second gate drive signal and deasserts the first gate drive signal.

20 Claims, 10 Drawing Sheets

ACTIVE CLAMP FLYBACK CONVERTER CONTROL WITH REDUCED CURRENT

BACKGROUND

Technical Field

This disclosure is directed to a controller and a method for controlling an active clamp flyback converter and, in particular, a controller and a method that control the converter while achieving zero voltage switching (ZVS) and minimizing the root mean square (RMS) current of the primary side of the converter.

Description of the Related Art

The active clamp flyback converter is a class of switching converters in which a clamp capacitance is used to recover and store energy leaked by a primary side winding or inductance. The energy is then released at the converter output. Conventional techniques for controlling the active clamp flyback converter employ complementary switching in which the primary side winding is energized in a first period and recovered energy is released to the output in a second period. These conventional techniques, however, suffer from a high RMS of the primary side current over the course of the switching cycle, which degrades the power efficiency of the converter.

BRIEF SUMMARY

In an embodiment, a controller for a converter includes a first output node for outputting a first gate drive signal for driving a gate of a first transistor in a primary side of the converter and a second output node for outputting a second gate drive signal for driving a gate of a second transistor in the primary side of the converter. In an embodiment, the controller includes logic configured to: operate the converter in a first phase in which the logic asserts the first gate drive signal to cause the first transistor to be conductive and deasserts the second gate drive signal to cause the second transistor to be non-conductive, operate the converter in a first deadtime phase and a second phase in which the logic deasserts both the first and second gate drive signals to cause leakage energy from a leakage inductance of a primary winding of the converter to be transferred to a clamp capacitance of the converter, and operate the converter in a third phase in which the logic asserts the second gate drive signal and deasserts the first gate drive signal.

In an embodiment, the logic is configured to operate the converter in a second deadtime phase, subsequent to the third phase, in which the logic deasserts both the first and second gate drive signals. In an embodiment, the logic is configured to: after the second deadtime phase, revert to operating the converter in the first phase. In an embodiment, the logic is configured to: detect a current level of a secondary winding of the converter, determine that the current level of the secondary winding is less than a current level threshold, and in response to determining that the current level of the secondary winding is less than the current level threshold, terminate the second phase and operate the converter in the third phase.

In an embodiment, the controller includes a third output node for outputting a third gate drive signal for driving a gate of a synchronous rectifier transistor in a secondary side of the converter. In an embodiment, the logic is configured to: deassert the third gate drive signal in the first phase, deassert the third gate drive signal in the first deadtime phase, assert the third gate drive signal in the second and third phases, and deassert the third gate drive signal in the second deadtime phase.

In an embodiment, a method includes operating, by a controller, a converter in a first phase. In an embodiment, the converter has a transformer including a primary winding and a secondary winding, a first transistor coupled to the primary winding, a second transistor coupled to the primary winding, and a clamp capacitance coupled to the second transistor. In an embodiment, the controller operates the converter in the first phase in which the controller asserts a first gate drive signal to cause the first transistor to be conductive and deasserts a second gate drive signal to cause the second transistor to be non-conductive.

In an embodiment, the controller operates the converter in a first deadtime phase and a second phase in which the controller deasserts both the first and second gate drive signals to cause leakage energy from a leakage inductance of the primary winding to be transferred to the clamp capacitance and operates the converter in a third phase in which the controller asserts the second gate drive signal and deasserts the first gate drive signal.

In an embodiment, a method includes operating, by a controller, a converter in a first phase. In an embodiment, the converter has a transformer including a primary winding and a secondary winding, a first transistor coupled to the primary winding, a second transistor coupled to the primary winding, and a clamp capacitance coupled to the second transistor. In an embodiment, the controller operates the converter in the first phase in which the controller asserts a first gate drive signal to cause the first transistor to be conductive and deasserts a second gate drive signal to cause the second transistor to be non-conductive.

In an embodiment, the controller operates the converter in a first deadtime phase in which the controller deasserts both the first and second gate drive signals and in which leakage energy from a leakage inductance of the primary winding is transferred to the clamp capacitance. In an embodiment, after the first deadtime phase, the controller operates the converter in a first subphase of a second phase in which the controller deasserts the first gate drive signal and asserts the second gate drive signal. In an embodiment, the controller operates the converter in a second subphase of the second phasephase, subsequent to the first subphase, in which the controller deasserts both the first and second gate drive signals and operates the converter in a third phase, subsequent to the second phase, in which the controller deasserts the first gate drive signal and asserts the second gate drive signal.

In an embodiment, a method includes operating the converter in a second deadtime phase in which the controller deasserts both the first and second gate drive signals. In an embodiment, a method includes after the second deadtime phase, reverting to operating the converter in the first phase. In an embodiment, a method includes setting a duration of the first subphase of the second phase as a proportion of a duration of the third phase. In an embodiment, the converter includes a synchronous rectifier transistor coupled to the secondary winding.

In an embodiment, a method includes deasserting a third gate drive signal in the first phase and the first deadtime phase to cause the synchronous rectifier transistor to be non-conductive, asserting the third gate drive signal in the first and second subphases of the second phase and in the third phase to cause the synchronous rectifier transistor to be conductive, and deasserting the third gate drive signal in the second deadtime phase. In an embodiment, a method includes deasserting a third gate drive signal in the first phase and the first deadtime phase to cause the synchronous rectifier transistor to be non-conductive, asserting the third gate drive signal in the first and second subphases of the second phase to cause the synchronous rectifier transistor to be conductive, and deasserting the third gate drive signal in the third phase and the second deadtime phase.

In an embodiment, a system includes a converter including a transformer having a primary winding in a primary side of the converter and a secondary winding in a secondary side of the converter; a first transistor configured to switch on and off voltage supply, from a voltage supply node, to the primary winding, a clamp capacitance, a second transistor configured to switch on and off charge transfer to the clamp capacitance, and a third transistor configured to switch on and off current flow in the secondary winding.

In an embodiment, a system includes a controller configured to operate the converter in a first phase in which the controller asserts a first gate drive signal to cause the first transistor to be conductive and deasserts a second gate drive signal to cause the second transistor to be non-conductive, operate the converter in a first deadtime in which the controller deasserts both the first and second gate drive signals and in which leakage energy from a leakage inductance of the primary winding is transferred to the clamp capacitance, operate the converter in a first subphase of a second phase in which the controller deasserts the first gate drive signal and asserts the second gate drive signal, operate the converter in a second subphase of the second phase-phase, subsequent to the first subphase, in which the controller deasserts both the first and second gate drive signals, and operate the converter in a third phase, subsequent to the second phase, in which the controller asserts the second gate drive signal, deasserts the first gate drive signal and asserts the second gate drive signal.

In an embodiment, the controller is configured to operate the converter in a second deadtime phase phase, subsequent to the third phase, in which the controller deasserts both the first and second gate drive signals, and after the second deadtime phase, revert to operating the converter in the first phase. In an embodiment, the controller is configured to cause a body diode of the third transistor to be non-conductive in the third phase by adjusting a duration of the third phase to control a voltage of the clamp capacitance.

DETAILED DESCRIPTION

Figure 1:
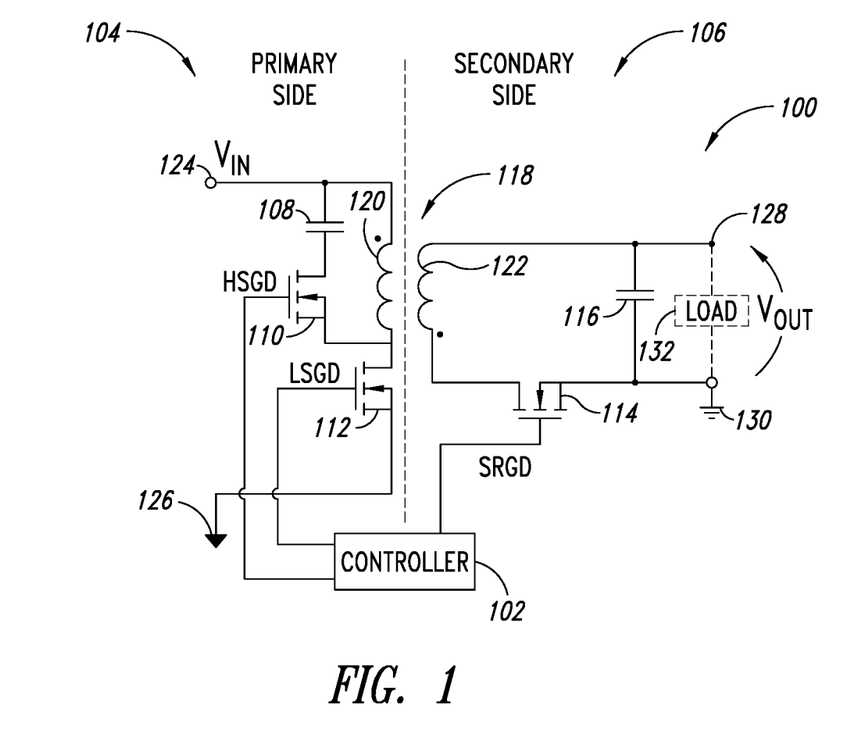
FIG. 1 shows a circuit diagram of an active clamp flyback converter coupled to a controller.

FIG. 1 shows a circuit diagram of an active clamp flyback converter 100 coupled to a controller 102. The converter 100 has a primary side 104 and a secondary side 106, which may be in galvanically isolated power domains. The converter 100 includes, in the primary side 104, a clamp capacitance 108, a high side transistor 110 and a low side transistor 112. The converter 100 includes, in the secondary side 106, a synchronous rectifier transistor 114 and an output capacitance 116. The converter 100 includes a transformer 118 having a primary winding 120 disposed in the primary side 104 and a secondary winding 122 disposed in the secondary side 106. The controller 102 is distributed over the primary and secondary sides 104, 106 and may have internal galvanic isolation between the primary and secondary sides 104, 106. However, in various embodiments the controller 102 may be in the primary side 104 or the secondary side 106.

In FIG. 1, the high side transistor 110 is represented as an n-channel metal-oxide-semiconductor field-effect transistor (MOSFET). Similarly, the low side transistor 112 and the synchronous rectifier transistor 114 are also represented as n-channel MOSFETs. It is noted that although n-channel MOSFET transistors are illustrated and described herein, other types of transistors or switches may be used in place of the transistors 110, 112, 114. For example, the synchronous rectifier transistor 114 may be a diode that is not directly controlled by the controller 102.

In the primary side 104, the clamp capacitance 108 has a first side coupled to an input voltage node 124 and a second side coupled to the drain of the high side transistor 110. The high side transistor 110 has a gate for receiving a high side gate drive signal HSGD from the controller 102. The primary winding 120 has a first terminal coupled to the input voltage node 124 and a second terminal coupled to the source of the high side transistor 110. The low side transistor 112 has a drain coupled to both the source of the high side transistor 110 and the second terminal of the primary winding 120. The low side transistor 112 has a gate for receiving a low side gate drive signal LSGD from the controller 102. The low side transistor 112 has a source coupled to a primary side reference voltage node 126, which may be a ground node of the primary side 104.

In the secondary side 106, the output capacitance 116 has a first side coupled to an output voltage node 128 and a second side coupled to a secondary side reference voltage node 130. The secondary side reference voltage node 130 may, for example, be a ground node of the secondary side 106. The synchronous rectifier transistor 114 has a gate for receiving a synchronous rectifier gate drive signal SRGD from the controller 102 and a source coupled to the secondary side reference voltage node 130. The secondary winding 122 of the transformer 118 has a first terminal coupled to the output voltage node 128 and a second terminal coupled to a drain of the synchronous rectifier transistors 114.

The controller 102 may be any type of device that is configured to output the high side, low side or synchronous rectifier gate drive signals to the converter 100 for operating the converter 100. The controller 102 may, for example, be a microcontroller, a processor or a microprocessor, among others. Further, the controller 102 may include circuitry or digital logic that is configured to determine a state of the gate drive signals (i.e., active or inactive, or asserted or deasserted) or the timing of the switching of the gate drive signals. The circuitry or logic may cause the gate drive signals to be output to the converter 100.

The converter 100 receives an input voltage ($V_{IN}$) over the input voltage node 124. The controller 102 operates the transistors 110, 112, 114 using their respective gate drive signals to provide an output voltage ($V_{OUT}$) over the output voltage node 128 to a load 132 coupled between the output voltage node 128 and the secondary side reference voltage node 130.

Figure 2:
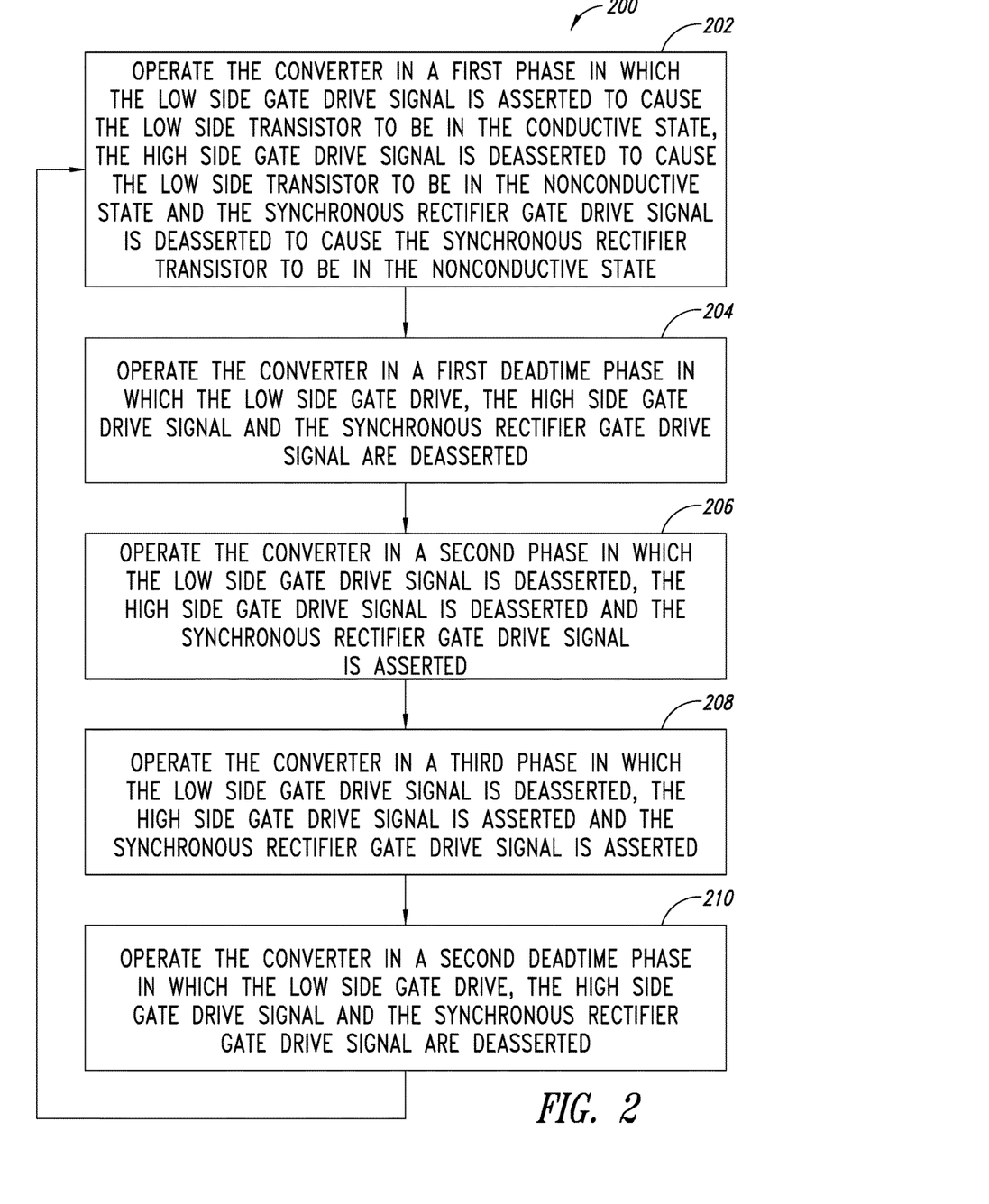
FIG. 2 shows a flow diagram of a method for operating the converter.

FIG. 2 shows a flow diagram of a method 200 for controlling the converter 100. The method 200 may be implemented by the controller 102 described with reference to FIG. 1. In the method 200, the controller 102, at 202, operates the converter 100 in a first phase in which the low side gate drive signal LSGD is asserted to cause the low side transistor 112 to be in the conductive state. During the first phase, which may have any duration of time, the high side gate drive signal HSGD is deasserted and the high side transistor 110 is nonconductive. Further, the synchronous rectifier gate drive signal is deasserted. It is noted that if a diode is used in place of a synchronous rectifier transistor, the diode may be off.

Figure 3:
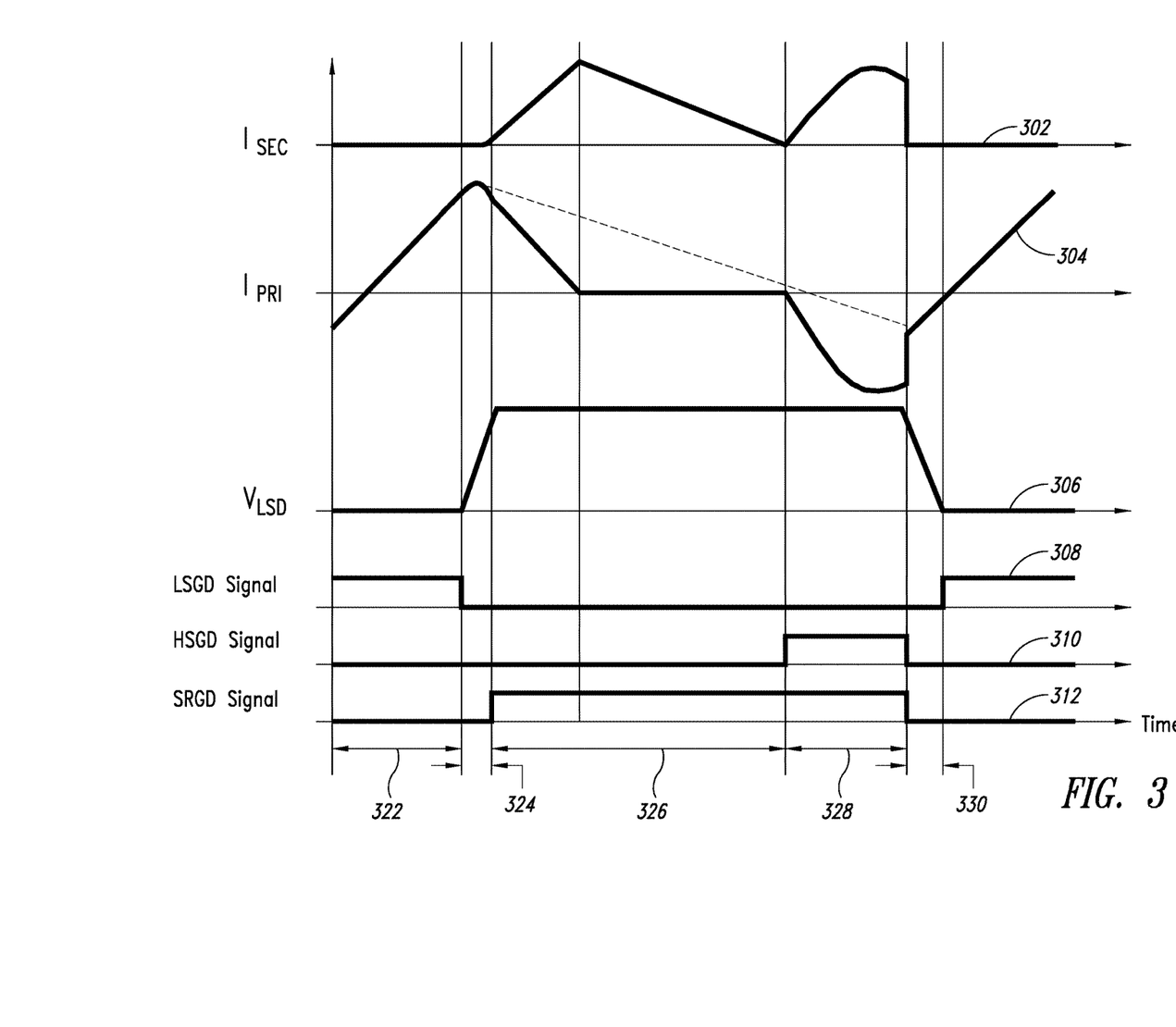
FIG. 3 shows signal diagrams of a secondary side current, a primary side current, a low side transistor drain voltage, a low side gate drive signal, a high side gate drive signal and a synchronous rectifier gate drive signal during phases of a control cycle of the method for operating the controller described with reference to FIG. 2.

Referring to FIG. 3, which shows signal diagrams of a secondary side current 302, a primary side current 304 and a low side transistor drain voltage 306, the low side gate drive signal 308, the high side gate drive signal 310 and the synchronous rectifier gate drive signal 312, phases 322, 324, 326, 328, 330 of a control cycle of the controller 102 are shown. The phases includes a first phase 322, a first deadtime phase 324, a second phase 326, a third phase 328 and a second deadtime phase 330. The control cycle commences with the first phase 322. The secondary side current 302 illustrates a current level through the secondary winding 122 of the transformer 118. The secondary side current 302 is positive in sign when flowing from the second terminal of the secondary winding 122 to the first terminal of the secondary winding 122.

As described herein, the synchronous rectifier transistor 114 may be a diode. In the event that the synchronous rectifier transistor 114 is a diode the controller 102 does not produce or output the synchronous rectifier gate drive signal 312. The controller 102 may only produce and output the low side and high side gate drive signals 308, 310. Rather, the diode may be induced to become conductive or nonconductive in accordance with the embodiments described herein due the control performed by the controller 102. For example, by controlling the low side and high side gate drive signals 308, 310, the controller 102 induces the synchronous rectifier diode to operate as described herein (and transition between the conductive and non-conductive states) as a result of induction in the secondary side 106 of the converter 100. Thus, despite the fact that the embodiments described herein describe the synchronous rectifier gate drive signal as being asserted or deasserted, it is understood that in the event that a diode is used the synchronous rectifier gate drive signal may not be output by the controller 102. Rather, the diode may transition between on and off states as described herein as a result of the induction rather than as a result of the synchronous rectifier gate drive signal, which is not generated.

The primary side current 304 illustrates a current level through the primary winding 120 of the transformer 118. The primary side current 304 is positive in sign when flowing from the first terminal of the primary winding 120 to the second terminal of the primary winding 120, and vice-versa.

The low side transistor drain voltage 306 illustrates a voltage level measured at the drain of the low side transistor 112, whereby the drain is coupled to the source of the high side transistor 110 and a second terminal of the primary winding 120 of the transformer 118.

During the first phase 322, switching the low side transistor 112 to the conductive state causes the primary side current 304 to increase (for example, linearly) over a temporal duration of the first phase 322. Meanwhile, current is not flowing through the secondary winding 122 and the secondary side current 302 is zero Amperes (A). Additionally, the low side transistor drain voltage 306 is zero Volts (V). During the first phase 322, the synchronous rectifier transistor 114 is turned off. Or in the case that a diode is used in place of the synchronous rectifier transistor 114, the diode will be nonconductive. The first phase 322 may end, and a first deadtime phase 324 may commence, when the current flowing through the low side transistor 112 (or the primary side current 304) reaches a first threshold.

After the first phase 322, the controller 102 transitions the converter 100 to the first deadtime phase 324. The controller 102 may transition the converter 100 to the first deadtime phase 324 when one or more conditions are met, such as, the primary side current 304 meeting or exceeding a current level threshold as described herein. In an embodiment, a sensor or a sense resistor is used to detect the primary side current 304. For example, the sensor or the sense resistor may be coupled to the primary side 104 and may be used to detect the primary side current 304. In another embodiment, primary side current 304 may be inferred based on detecting a source or a drain voltage of the high side or low side transistors 110, 112.

In the method 200, the controller 102, at 204, operates the converter 100 in the first deadtime phase 324 in which the low side gate drive signal LSGD and the high side gate drive signal HSGD are deasserted to cause the low side transistor 112 and the high side transistor 110 to be in the nonconductive state. In the first deadtime phase 324, the synchronous rectifier gate drive signal 312 is deasserted or if a diode is used the diode is off.

The first deadtime phase 324 may have a fixed or a pre-determined duration (for example, in a primary side controlled system) or the first deadtime phase may end based on a voltage of the secondary winding 122 of the transformer 118 meeting a condition, such as exceeding a threshold (for example, in a secondary side controlled system). In the first deadtime phase 324, the primary side current 304 stops flowing through the low side transistor 112. Instead, the primary side current 304 flows through parasitic elements of the low side transistor's 112 drain. The parasitic elements include a parasitic capacitance of the transformer 118, a drain capacitance of the low side transistor 112 and a source capacitance of the high side transistor 110. Due to the parasitic capacitance, the low side drain voltage 306 rises.

During the first deadtime phase 324, the primary side current 304 slightly increases and then decreases. It is noted that in the first deadtime phase 324, the synchronous rectifier transistor 114 remains off due to the deassertion of the synchronous rectifier gate drive signal SRGD. Alternatively, if a diode is used, the diode will be turned off due to the lack of induction of the secondary winding 122. The energy of the leakage inductance of the primary winding 120 may be transferred to the clamp capacitance 108 when the low side drain voltage 306 reaches a voltage level of the clamp capacitance 108.

The controller 102, at 206, then operates the converter 100 in a second phase 326 after the first deadtime phase 324. The second phase 326 may succeed the first deadtime phase 324 and may be immediately after the first deadtime phase 324.

Similar to the first deadtime phase 324, the controller 102, at 206, operates the converter 100 in the second phase 326 by continuing to deassert the low side and high side gate drive signals to cause the low side and high side transistors 112, 110 to be in the nonconductive state until the secondary side current is reduced below a second threshold for current or until a zero current condition of the secondary side 106 or a zero crossing condition is detected. Further, the synchronous rectifier gate drive signal SRGD is also deasserted. The second threshold may be 0 A or slightly higher than 0 A, such as 0.1 A. In the second phase 326, the synchronous rectifier transistor 114 is turned on (i.e., is conductive) and where the diode is used, the diode will be turned on by the direction of the secondary side current 302 and induction of the secondary winding 122. In an embodiment, a sensor or a sense resistor is used to detect the secondary side current. For example, the sensor or the sense resistor may be coupled to the secondary side 106 and may be used to detect the secondary side current. In another embodiment, the secondary side current may be inferred based on detecting a source or a drain voltage of the synchronous rectifier transistor 114.

Because the low side gate drive signal 308 and the high side gate drive signal 310 are similarly operated in the first deadtime phase 324 and the second phase 326, the two phases may be considered one phase from the perspective of the controller 102. The two phases may not be delineated or separate from the perspective of the controller 102

The controller 102 may be coupled to the primary and secondary sides 104, 106 of the converter 100. The controller 102 may detect the current levels in the primary and secondary sides 104, 106. Or the controller 102 may receive a signal indicating the current level of the primary and secondary sides 104, 106. When the secondary side current 302 reaches 0 A or decreases below the second threshold for current, the controller 102 may terminate the second phase 326 and commence the third phase 328.

During the second phase 326, current starts flowing in the secondary side 106, while the current in the leakage inductance of the primary side 104 starts dropping and its energy is transferred to the clamp capacitance 108. Further, current flows through the high side transistor 110 body diode and that current eventually ceases.

After the secondary side current 302 reaches a peak during the second phase 326, induction causes the secondary side current 302 to flow with a negative rate of change over time. Additionally, after energy is transferred to the clamp capacitance 108, no current flows in the primary side 104 due to the fact that the low side and high side transistors 112, 110 are turned off and are in high impedance states.

During a portion of the second phase 326, the primary side current 304 is retained at a zero or near a zero level. The retention reduces the primary side current 304 (and, consequently the overall RMS of the primary side current 304), thereby improving the energy efficiency of the converter 100 as compared to an operating mode having a higher current level.

When the secondary side current 302 reaches 0 A or is a at level close to 0 A or below the second threshold for current, the optimal conditions for zero voltage switching (ZVS) are met with both the secondary and primary side currents 302, 304 being at or near 0 A. At 208 in the method 200, the controller 102 operates the converter 100 in a third phase 328 in which the high side gate drive signal is asserted to cause the high side transistor 110 to be in the conductive state and the low side gate drive signal is deasserted to cause the low side transistor 112 to be in the nonconductive state. The synchronous rectifier transistor 114 is also turned on in the third phase 328.

A resonance in the converter 100 occurs during the third phase 328. The voltage stored in the clamp capacitance 108 discharges causing the primary side current 304 to become negative. Concurrently, the secondary side current 302 becomes positive, which causes power to be delivered to the load 132. The primary side and secondary side currents 304, 302 increase in instantaneous magnitude and later decrease in instantaneous magnitude. Following the third phase 328, the controller 102 transitions the converter 100 to a second deadtime phase 330.

In the method 200, at 210, the controller 102 operates the converter 100 in the second deadtime phase 330 in which the low side gate drive signal and the high side gate drive signal are both deasserted to cause the low side transistor 112 and the high side transistor 110 to be in the nonconductive state. The controller 102 operates the converter 100 and the second deadtime phase 330 similarly to the first deadtime phase 324. Similar to the first deadtime phase 324, neither of the primary side transistors 110, 112 are conductive in the second deadtime phase 330. The synchronous rectifier transistor 114 is also turned off in the second deadtime phase 330. During the second deadtime phase 330, current flows through the parasitic capacitance of the primary side 104 and the low side drain voltage drops to 0V. Additionally, the primary side current 304 drops to 0 A and the secondary side current 302 stays at 0 A. Following the second deadtime phase 330, the method 200 that reverts back to step 202, where the controller 102 operates the converter 100 in the first phase 322 in a subsequent switching cycle of the converter 100.

In the method 200, the controller 102 forgoes turning on the high side transistor 110 after the primary side current 304 reaches zero in the second phase 326. The controller 102 keeps the high side transistor 110 off. As a result, current does not flow in the primary winding 120 during the second phase 326 after it reaches zero because both transistors 110, 112 of the primary side 104 are off.

In an embodiment, the second phase 326 is divided into two portions and the high side transistor 110 is turned on to reduce losses in the body diode of the high side transistor 110. The duration of turning on the high side transistor 110 may be predetermined. The duration of turning on the high side transistor 110 may be set in relation to the duration of the third phase 328. For example, the duration of turning on the high side transistor 110 may be set as a percentage or a proportion of the duration of the third phase 328.

Figure 4:
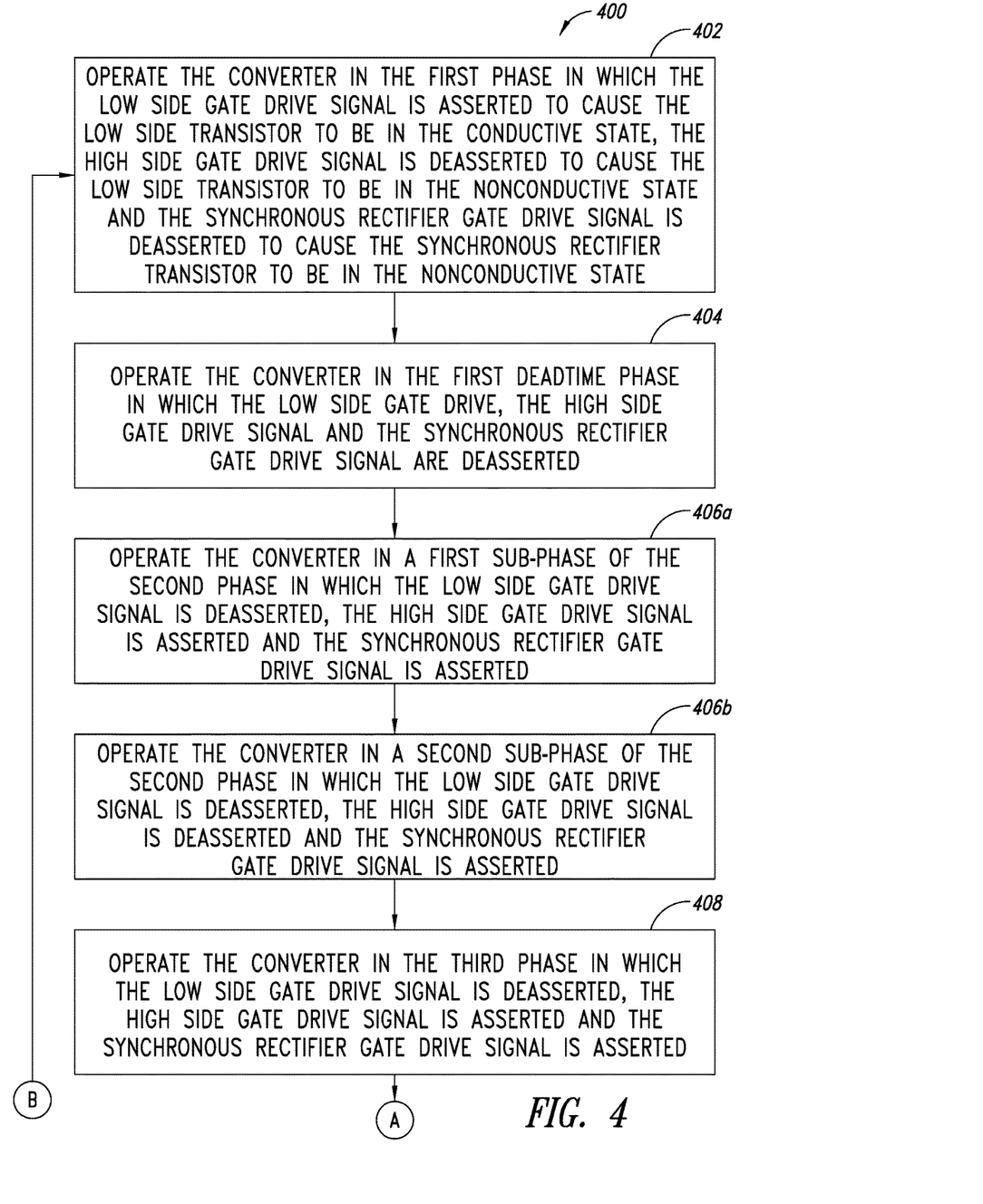
FIG. 4 shows a flow diagram of a method for operating the converter.
Figure 5:
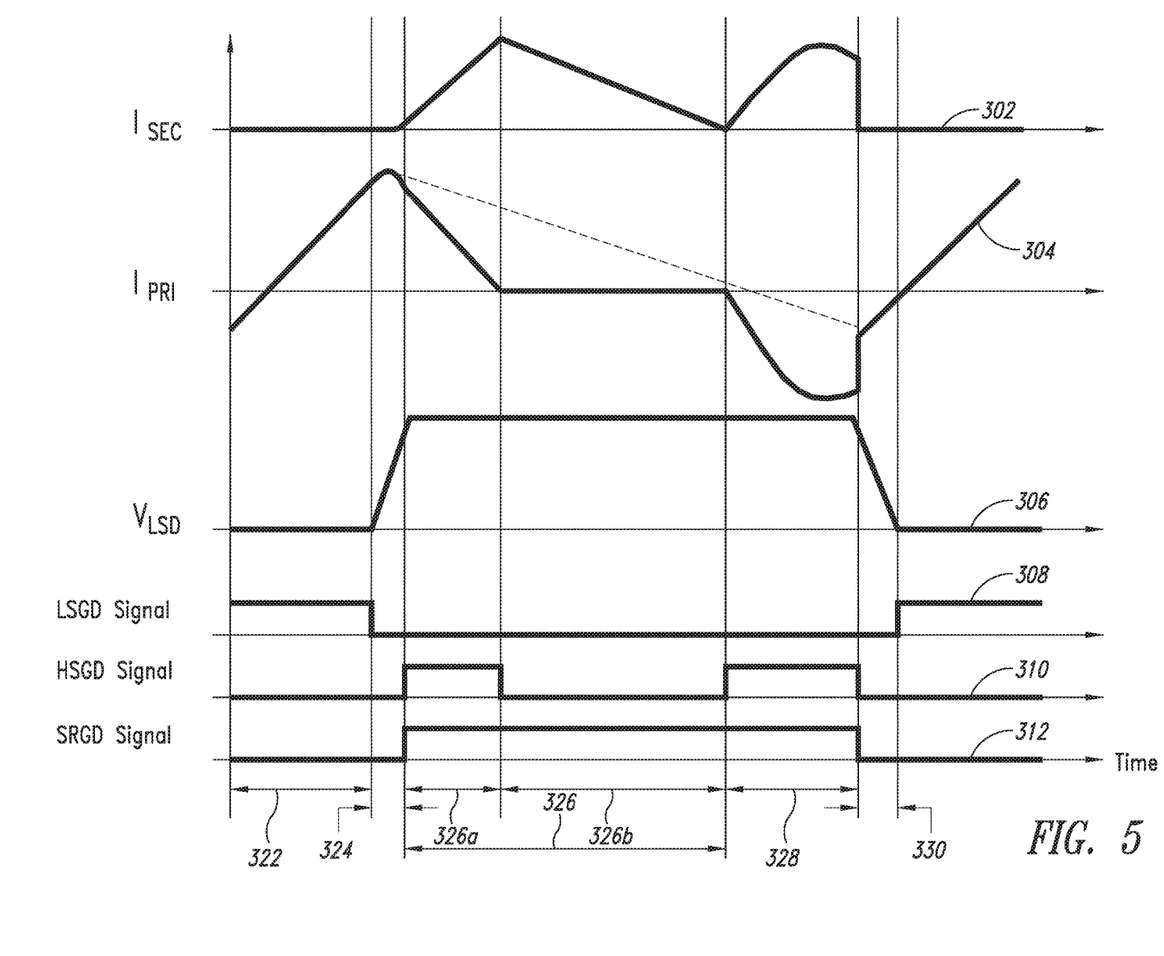
FIG. 5 shows signal diagrams during phases of a control cycle of the method for operating the converter described with reference to FIG. 4.

FIG. 4 shows a flow diagram of a method 400 for controlling the converter 100. The method 400 may be implemented by the controller 102 described with reference to FIG. 1 for operating the converter 100. Steps 402, 404, 408, 410 of the method 400 are similar to steps 202, 204, 208, 210 of the method 200 described with reference to FIG. 2. FIG. 5 shows signal diagrams during phases 322, 324, 326a, 326b, 328, 330 of a control cycle of the controller 102 described with reference to FIG. 4.

After operating the converter 100 in the first deadtime phase, the controller 102, at 406a, operates the converter in a first sub-phase 326a of a second phase 326 in which the low side gate drive signal is deasserted, the high side gate drive signal is asserted and the synchronous rectifier gate drive signal is asserted. As described herein, asserting the high side gate drive signal to turn on the high side transistor 110 reduces losses in the body diode of the high side transistor 110. The duration of the first sub-phase 326a of the second phase 326 may be set in relation to the duration of the third phase 328. For example, the duration of the first sub-phase 326a may be set as a percentage or a portion of the duration of the third phase 328.

After the first sub-phase 326a ends, the controller 102, at 406b, operates the converter in a second sub-phase 326b of the second phase 326 in which the low side gate drive signal is deasserted, the high side gate drive signal is deasserted and the synchronous rectifier gate drive signal is asserted. Operation in the second sub-phase 326b is similar to operation in the second phase 326 described with reference to FIGS. 2 and 3.

Per the method 400, the first sub-phase 326a of the second phase 326 is reserved for turning on the high side transistor 110. In the remainder of the second phase 326 (i.e., the second sub-phase 326b), the high side transistor 110 is turned off as per the operation of the method 200.

During the third phase 328, the primary and secondary side currents 304, 302 increase in instantaneous magnitude. The increase contributes to an increase in the overall root mean square (RMS) of the primary side current 304 and the overall RMS of the secondary side current 302 during operation of the converter 100.

If the instantaneous magnitude of the primary side current 304 is reduced during the third phase 328, the overall RMS of the primary side current 304 is also reduced, thereby increasing the power efficiency of the converter 100. Reducing the instantaneous magnitude of the primary side current 304 during the third phase 328, which is exhibited by a "bump" or "dome" in FIG. 3, increases the efficiency of the converter 100.

Figure 6:
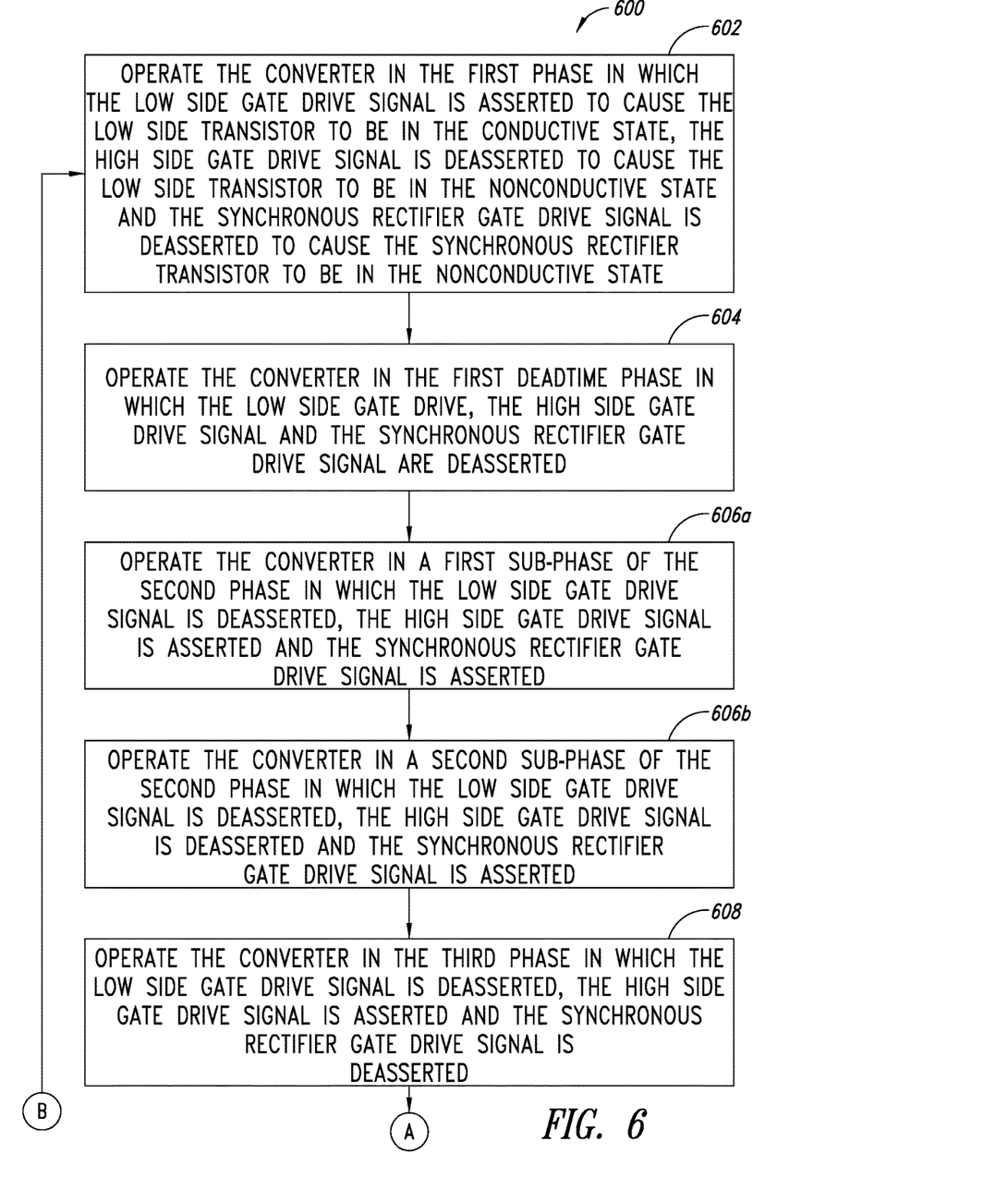
FIG. 6 shows a flow diagram of a method for operating the converter.
Figure 7:
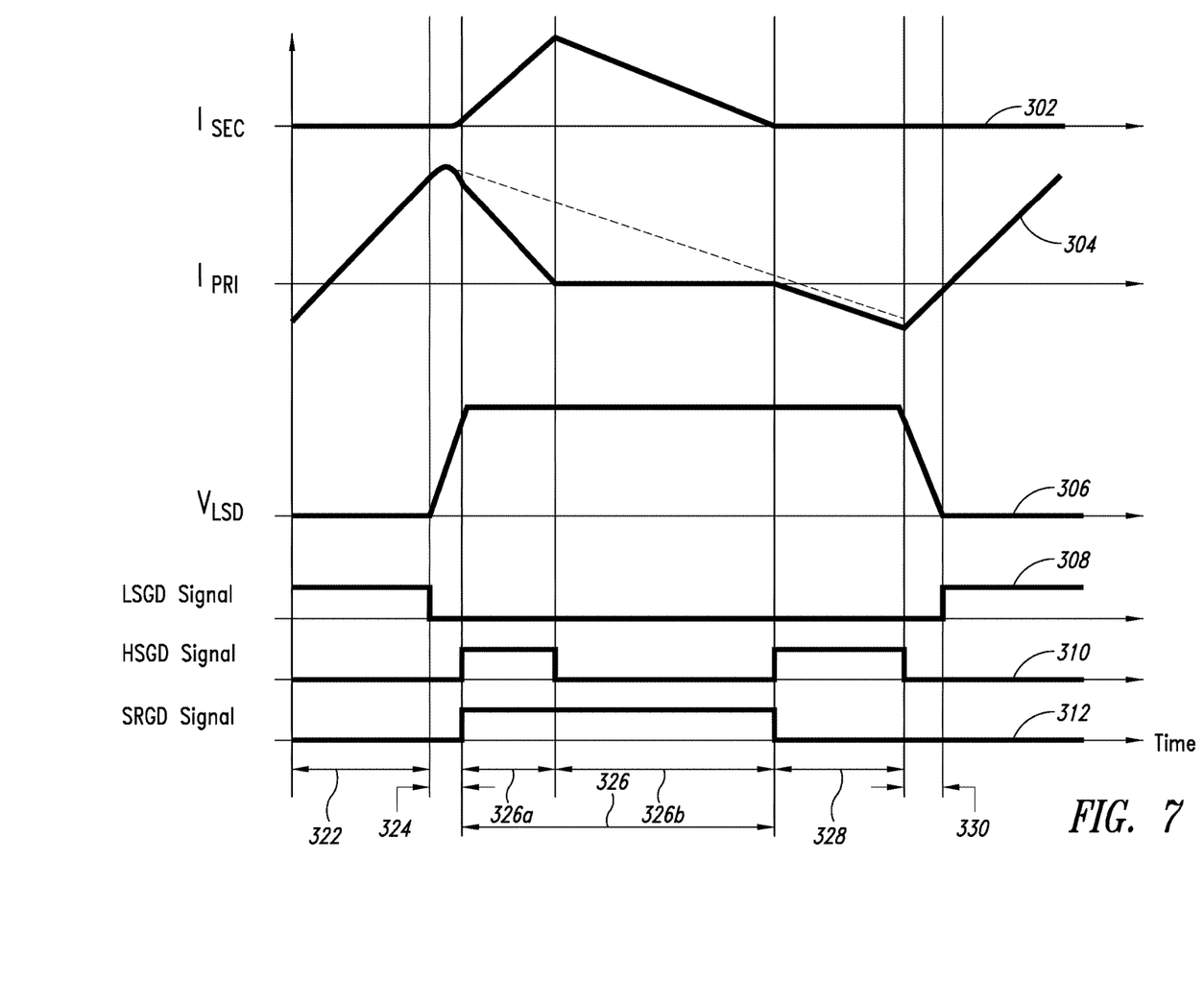
FIG. 7 shows signal diagrams during phases of a control cycle of the method for operating the converter described with reference to FIG. 6.

FIG. 6 shows a flow diagram of a method 600 for operating the converter 100 and FIG. 7 shows signal diagrams during phases 322, 324, 326a, 326b, 328, 330 of a control cycle of the method 600 for operating the controller 102 described with reference to FIG. 6.

In the method 600, the controller 102 operates the converter 100 in the phases 322, 324, 326, 330 similar to the manner in which the controller 102 operates the converter 100 in these phases 322, 324, 326, 330, respectively, per the method 400 of FIG. 4. Thus, steps 602, 604, 606a, 606b, 610 of FIG. 6 are similar to steps 402, 404, 406a, 406b, 410, respectively, of FIG. 4. However, the controller 102 operates the converter 100 differently during the third phase 328, at 608, to reduce the primary and secondary side currents 304, 302 and reduce the RMS of the current of the converter 100.

At 608, the controller 102 operates the converter 100 in the third phase 328 in which the low side gate drive signal is deasserted, the high side gate drive signal is asserted and the synchronous rectifier gate drive signal is deasserted. Therefore, the high side transistor 110 is the conductive state and both the low side transistor 112 and the synchronous rectifier transistor 114 are in the nonconductive state. Furthermore, the controller 102 operates the converter 100 ensuring that body diode of the synchronous rectifier transistor 114 is in the non-conductive state.

Because the synchronous rectifier transistor 114 is off, current does not flow in the secondary side 106. The secondary side current 302 is at a zero level during the third phase 328. Because the low side transistor 112 is turned off, the voltage stored in the clamp capacitance 108 discharges causing the primary side current 304 to become negative. The primary and secondary windings 120, 122 do not experience a resonance in the third phase 328 due to the fact that the synchronous rectifier transistor 114 is off and the secondary side current 302 is at a zero level. As a result, the instantaneous magnitude of the primary side current 304 increases linearly due to the discharging of the clamp capacitance 108.

To keep the secondary side current 302 at a zero level, the body diode of the synchronous rectifier transistor 114 is prevented from becoming conductive. The controller 102 may operate the converter 100 in the third phase 328 by retaining the body diode of the synchronous rectifier transistor 114 in the non-conductive state.

During the third phase 328, to prevent current flow in the body diode of the synchronous rectifier transistor 114, the following condition is to be met:

$$V_{PH} < V_{IN} + n(V_{OUT} + V_F) \quad \text{Equation (1),}$$

where $V_{PH}$ is the low side transistor drain voltage, n is the turns ratio of the transformer 118 and $V_F$ is the forward voltage of the body diode of the synchronous rectifier transistor 114.

Figure 8:
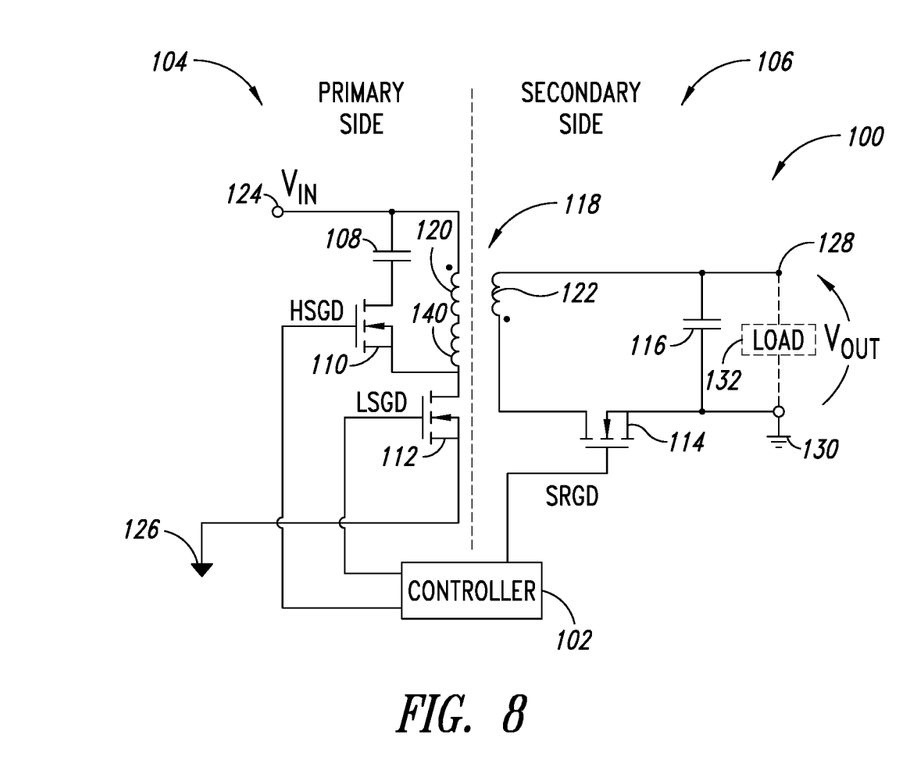
FIG. 8 shows a circuit diagram of the active clamp flyback converter having a leakage inductance illustrated.

FIG. 8 shows a circuit diagram of the active clamp flyback converter 100 having a leakage inductance 140 illustrated. The leakage inductance 140 of the primary winding 120 of the converter 100 is schematically illustrated in FIG. 6. The leakage inductance 140 is modelled as having a first terminal coupled to the second terminal of the primary winding 120 and a second terminal coupled to the drain of the low side transistor 112. With the leakage inductance 140 being modelled in the converter 100, the primary winding 120 of the converter 100 may be assumed to be free of parasitic inductance.

In the third phase 328, the low side transistor drain voltage ($V_{PH}$) is the same as the voltage across the clamp capacitance 108 ($V_{CLAMP}$). The clamp capacitance 108 is charged during the first deadtime phase 324 and stores the energy in the leakage inductance 140. The clamp capacitance 108 is discharged during the second deadtime phase 330, where the clamp is reset. An equilibrium is reached when the charge and discharge are equal.

When the low side transistor 112 is turned off, the transformer 118 reflects the output voltage, and the voltage across the leakage inductance 140 is represented as:

$$V_{LK} = V_{CLAMP} - nV_{oUT} \quad \text{Equation (2).}$$

The primary side current is represented as:

$$i_{PRI} = I_{PK} - \frac{V_{LK}}{L_K}t, \quad \text{Equation (3)}$$

where $I_{PK}$ is a peak primary side current reached of the during the first phase 322, $L_K$ is the leakage inductance and t is the time variable.

Equation (3) yields the total charge stored in the clamp capacitance 108 as:

$$q_{CLAMP} = \frac{I_{PK}^2 L_K}{2V_{LK}}. \quad \text{Equation (4)}$$

When the high side transistor 110 is turned on in the third phase 328, current does not flow in the secondary side 106 as long as the voltage across the secondary winding 122 is less than $V_{OUT} V_F$. The primary side current 304 ($i_{PRI}$) starts at 0 A and drops with a rate of $$\frac{\partial i_{PRI}}{\partial t} = -\frac{V_{CLAMP}}{L_{PRI}}, \quad \text{Equation (5)}$$

where $L_{PRI}$ is the primary side inductance.

The current in the clamp capacitance 108 is obtained from Equation (5) as:

$$i_{PRI} = -\frac{V_{CLAMP}}{L_{PRI}} t. \quad \text{Equation (6)}$$

The charge stored in the clamp capacitance 108 is obtained from Equation (6) as:

$$q_{CLAMP} = -\frac{V_{CLAMP}}{L_{PRI}} T_{CLAMP}^2, \quad \text{Equation (7)}$$

where $T_{CLAMP}$ is the time during which the clamp is turned on (i.e., the duration of the first deadtime phase 324).

An equilibrium occurs when the charge stored in the clamp capacitance 108 (represented by Equation (4)) and dissipated from the clamp capacitance 108 (represented by Equation (7)) are equal. Equating the two charges yields:

$$\frac{I_{PK}^2 L_K}{2 V_{LK}} - \frac{V_{CLAMP}}{L_{PRI}} T_{CLAMP}^2 = 0. \quad \text{Equation (8)}$$

Replacing the clamp time ($T_{CLAMP}$) with the peak negative current reached during clamp phase and replacing $V_{LK}$ with the representation in Equation (2) yields:

$$\frac{I_{PK}^2 L_K}{2(V_{CLAMP} - nV_O)} = \frac{I_{CLAMP}^2 L_{PRI}}{V_{CLAMP}}, \quad \text{Equation (9)}$$

which is solved for $V_{CLAMP}$ to obtain:

$$V_{CLAMP} = \frac{2 I_{CLAMP}^2 L_{PRI} n V_O}{2 I_{CLAMP}^2 L_{PRI} - I_{PK}^2 L_K}, \quad \text{Equation (10)}$$

Thus, to keep $V_{CLAMP} < n(V_{OUT} + V_F)$ and avoid turning on the body diode of the synchronous rectifier transistor 114, the following limit is imposed on the clamp current:

$$I_{CLAMP} < -I_{PK} \sqrt{\frac{1}{2} \frac{L_K}{L_{PRI}} \left(1 - \frac{V_{OUT}}{V_F}\right)}. \quad \text{Equation (11)}$$

When the inequality of Equation (11) is satisfied, the body diode of the synchronous rectifier transistor 114 is retained in the non-conductive state. The leakage inductance ($L_K$), primary side inductance ($L_{PRI}$) and forward voltage of the body diode of the synchronous rectifier transistor 114 ($V_F$) are typically constants. The output voltage ($V_{OUT}$), peak primary side current reached during the first phase 322 ($I_{PK}$) and clamp current ($I_{CLAMP}$) are variables.

Thus, the controller 102 may control the peak primary side current reached during the first phase 322 ($I_{PK}$) to ensure that the inequality is met during the third phase 328. The peak current is correlated with the duration of the first phase 322 and, thus, the controller 102 may adjust the duration of the first phase 322 by increasing or decreasing the duration to achieve a suitable level of the right side of the inequality (11). Further, the controller 102 may control the output voltage ($V_{OUT}$) or the clamp current ($I_{CLAMP}$) to satisfy the inequality and put the body diode in the non-conductive state.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller for a converter, comprising:
   a first output node for outputting a first gate drive signal for driving a gate of a first transistor in a primary side of the converter;
   a second output node for outputting a second gate drive signal for driving a gate of a second transistor in the primary side of the converter; and
   logic configured to:
      operate the converter in a first phase in which the logic asserts the first gate drive signal to cause the first transistor to be conductive and deasserts the second gate drive signal to cause the second transistor to be non-conductive;
      operate the converter in a first deadtime phase and a second phase in which the logic deasserts both the first and second gate drive signals to cause leakage energy from a leakage inductance of a primary winding of the converter to be transferred to a clamp capacitance of the converter; and
      operate the converter in a third phase in which the logic asserts the second gate drive signal and deasserts the first gate drive signal.

2. The controller of claim 1, wherein the logic is configured to:
   operate the converter in a second deadtime phase, subsequent to the third phase, in which the logic deasserts both the first and second gate drive signals.

3. The controller of claim 2, wherein the logic is configured to:
   after the second deadtime phase, revert to operating the converter in the first phase.

4. The controller of claim 1, wherein the logic is configured to:
   detect a current level of a secondary winding of the converter;
   determine that the current level of the secondary winding is less than a current level threshold; and
   in response to determining that the current level of the secondary winding is less than the current level threshold, terminate the second phase and operate the converter in the third phase.

5. The controller of claim 2, wherein the controller includes a third output node for outputting a third gate drive signal for driving a gate of a synchronous rectifier transistor in a secondary side of the converter and the logic is configured to:
  deassert the third gate drive signal in the first phase;
  deassert the third gate drive signal in the first deadtime phase;
  assert the third gate drive signal in the second and third phases; and
  deassert the third gate drive signal in the second deadtime phase.

6. A method, comprising:
  operating, by a controller, a converter in a first phase, the converter having a transformer including a primary winding and a secondary winding, a first transistor coupled to the primary winding, a second transistor coupled to the primary winding, and a clamp capacitance coupled to the second transistor, the controller operating the converter in the first phase in which the controller asserts a first gate drive signal to cause the first transistor to be conductive and deasserts a second gate drive signal to cause the second transistor to be non-conductive;
  operating the converter in a first deadtime phase and a second phase in which the controller deasserts both the first and second gate drive signals to cause leakage energy from a leakage inductance of the primary winding to be transferred to the clamp capacitance; and
  operating the converter in a third phase in which the controller asserts the second gate drive signal and deasserts the first gate drive signal.

7. The method of claim 6, comprising:
  operating the converter in a second deadtime phase, subsequent to the third phase, in which the controller deasserts both the first and second gate drive signals.

8. The method of claim 7, comprising:
  after the second deadtime phase, reverting to operating the converter in the first phase.

9. The method of claim 6, comprising:
  detecting a current level of the secondary winding;
  determining that the current level of the secondary winding is less than a current level threshold; and
  in response to determining that the current level of the secondary winding is less than the current level threshold, terminating the second phase and operating the converter in the third phase.

10. The method of claim 7, wherein the converter includes a synchronous rectifier transistor coupled to the secondary winding and the method comprises:
  deasserting a third gate drive signal in the first phase and the first deadtime phase to cause the synchronous rectifier transistor to be non-conductive;
  asserting the third gate drive signal in the second and third phases to cause the synchronous rectifier transistor to be conductive; and
  deasserting the third gate drive signal in the second deadtime phase.

11. A method, comprising:
  operating, by a controller, a converter in a first phase, the converter having a transformer including a primary winding and a secondary winding, a first transistor coupled to the primary winding, a second transistor coupled to the primary winding, and a clamp capacitance coupled to the second transistor, the controller operating the converter in the first phase in which the controller asserts a first gate drive signal to cause the first transistor to be conductive and deasserts a second gate drive signal to cause the second transistor to be non-conductive;
  operating the converter in a first deadtime phase in which the controller deasserts both the first and second gate drive signals and in which leakage energy from a leakage inductance of the primary winding is transferred to the clamp capacitance;
  after the first deadtime phase, operating the converter in a first subphase of a second phase in which the controller deasserts the first gate drive signal and asserts the second gate drive signal;
  operating the converter in a second subphase of the second phasephase, subsequent to the first subphase, in which the controller deasserts both the first and second gate drive signals; and
  operating the converter in a third phase, subsequent to the second phase, in which the controller deasserts the first gate drive signal and asserts the second gate drive signal.

12. The method of claim 11, comprising:
  operating the converter in a second deadtime phase in which the controller deasserts both the first and second gate drive signals.

13. The method of claim 12, comprising:
  after the second deadtime phase, reverting to operating the converter in the first phase.

14. The method of claim 11, comprising:
  setting a duration of the first subphase of the second phase as a proportion of a duration of the third phase.

15. The method of claim 11, wherein the converter includes a synchronous rectifier transistor coupled to the secondary winding.

16. The method of claim 15, comprising:
  deasserting a third gate drive signal in the first phase and the first deadtime phase to cause the synchronous rectifier transistor to be non-conductive;
  asserting the third gate drive signal in the first and second subphases of the second phase and in the third phase to cause the synchronous rectifier transistor to be conductive; and
  deasserting the third gate drive signal in the second deadtime phase.

17. The method of claim 15, comprising:
  deasserting a third gate drive signal in the first phase and the first deadtime phase to cause the synchronous rectifier transistor to be non-conductive;
  asserting the third gate drive signal in the first and second subphases of the second phase to cause the synchronous rectifier transistor to be conductive; and
  deasserting the third gate drive signal in the third phase and the second deadtime phase.

18. A system, comprising:
  a converter including:
    a transformer having a primary winding in a primary side of the converter and a secondary winding in a secondary side of the converter;
    a first transistor configured to switch on and off voltage supply, from a voltage supply node, to the primary winding;
    a clamp capacitance;
    a second transistor configured to switch on and off charge transfer to the clamp capacitance; and
    a third transistor configured to switch on and off current flow in the secondary winding; and
  a controller configured to:

operate the converter in a first phase in which the controller asserts a first gate drive signal to cause the first transistor to be conductive and deasserts a second gate drive signal to cause the second transistor to be non-conductive;

operate the converter in a first deadtime in which the controller deasserts both the first and second gate drive signals and in which leakage energy from a leakage inductance of the primary winding is transferred to the clamp capacitance;

operate the converter in a first subphase of a second phase in which the controller deasserts the first gate drive signal and asserts the second gate drive signal;

operate the converter in a second subphase of the second phasephase, subsequent to the first subphase, in which the controller deasserts both the first and second gate drive signals; and operate the converter in a third phase, subsequent to the second phase, in which the controller asserts the second gate drive signal, deasserts the first gate drive signal and asserts the second gate drive signal.

19. The system of claim 18, wherein the controller is configured to:

operate the converter in a second deadtime phase phase, subsequent to the third phase, in which the controller deasserts both the first and second gate drive signals; and after the second deadtime phase, revert to operating the converter in the first phase.

20. The system of claim 18, wherein the controller is configured to cause a body diode of the third transistor to be non-conductive in the third phase by adjusting a duration of the third phase to control a voltage of the clamp capacitance.

* * * * *